(12) United States Patent
Adams

(10) Patent No.: US 10,896,533 B2
(45) Date of Patent: Jan. 19, 2021

(54) AUTOMATED IDENTIFICATION OF GEOGRAPHIC SITE BOUNDARIES

(71) Applicant: Verizon Patent and Licensing Inc., Arlington, VA (US)

(72) Inventor: Nathan G. Adams, Christchurch (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/294,406

(22) Filed: Mar. 6, 2019

(65) Prior Publication Data

US 2020/0286271 A1 Sep. 10, 2020

(51) Int. Cl.
| | |
|---|---|
| *G06T 11/60* | (2006.01) |
| *G06T 7/13* | (2017.01) |
| *G06T 7/90* | (2017.01) |
| *G06K 9/00* | (2006.01) |
| *G06F 16/29* | (2019.01) |
| *G06F 3/0484* | (2013.01) |

(52) U.S. Cl.
CPC .......... *G06T 11/60* (2013.01); *G06F 3/04845* (2013.01); *G06F 16/29* (2019.01); *G06K 9/0063* (2013.01); *G06T 7/13* (2017.01); *G06T 7/90* (2017.01); *G06T 2207/10032* (2013.01); *G06T 2215/12* (2013.01)

(58) Field of Classification Search
CPC ................................. G06T 11/60; G06T 7/13
USPC ....................................................... 345/634
See application file for complete search history.

(56) References Cited

U.S. PATENT DOCUMENTS

| | | | | |
|---|---|---|---|---|
| 2006/0125799 | A1* | 6/2006 | Hillis | G06F 3/04815 345/173 |
| 2008/0157990 | A1* | 7/2008 | Belzer | G06Q 10/06 340/678 |
| 2017/0308549 | A1* | 10/2017 | Sims | G06Q 50/16 |

* cited by examiner

*Primary Examiner* — Shivang I Patel

(57) ABSTRACT

A geographic information system (GIS) can receive, from a client device, an input indicating selection of a geographic site. The GIS can select, based on receiving the input, one or more political boundaries associated with the geographic site, one or more cadastral boundaries associated with the geographic site, and one or more aerial images associated with the geographic site. The GIS can generate an overlay that comprises a visual indication of the one or more political boundaries, a visual indication of the one or more cadastral boundaries, and a visual indication of one or more objects identified in the one or more aerial images. The GIS can transmit, to the client device, an instruction to display the overlay.

20 Claims, 7 Drawing Sheets

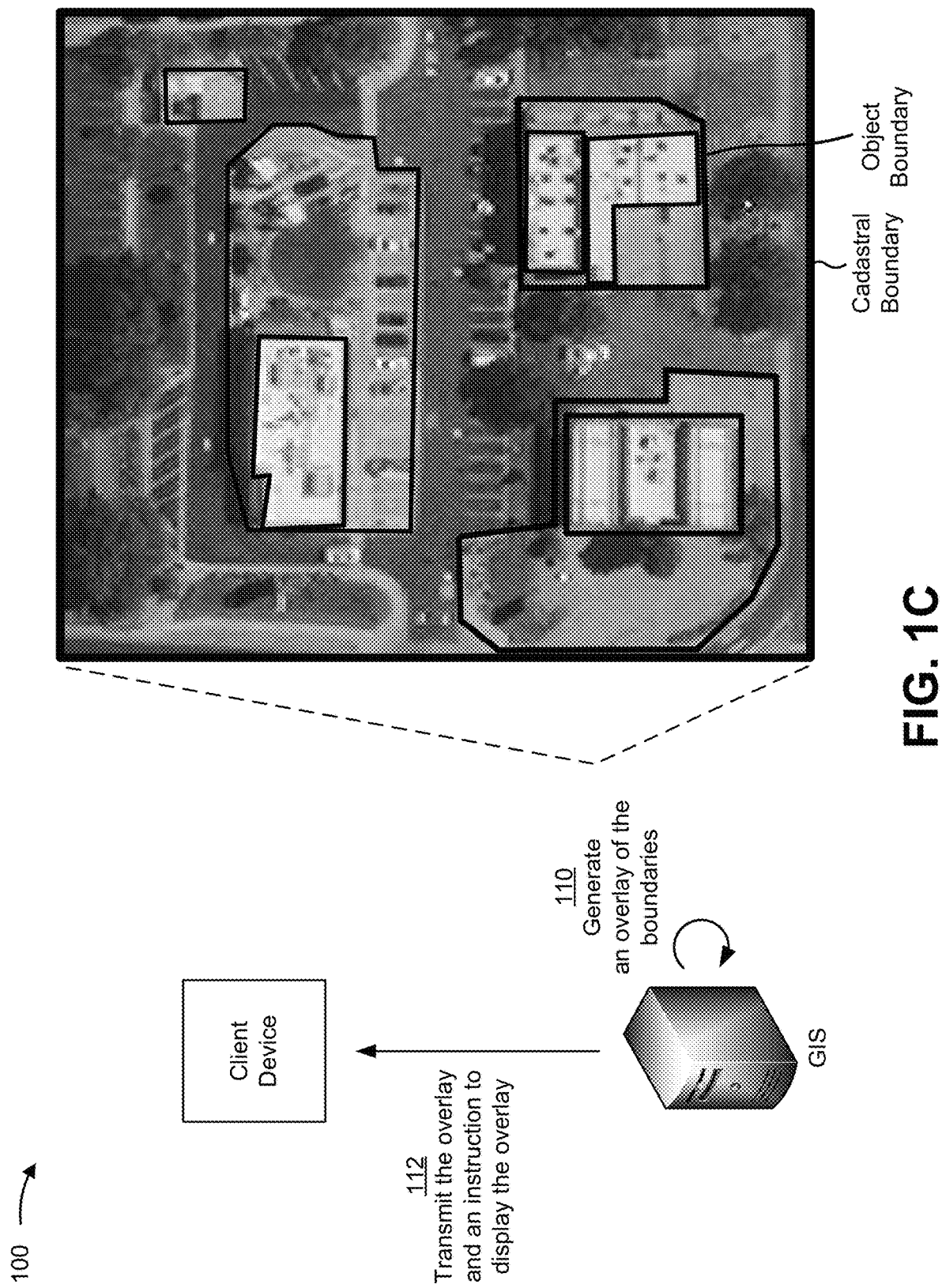

AUTOMATED IDENTIFICATION OF GEOGRAPHIC SITE BOUNDARIES

BACKGROUND

Geographic information system (GIS) applications may be used to capture, store, manipulate, analyze, manage, and present spatial or geographic data. GIS applications may include tools that permit users to create interactive queries (user-created searches), analyze spatial information, edit data in maps, and present the results of all these operations.

BRIEF DESCRIPTION OF THE DRAWINGS

FIGS. 1A-1D are diagrams of one or more example implementations described herein.

DETAILED DESCRIPTION OF PREFERRED EMBODIMENTS

Figure 1A:
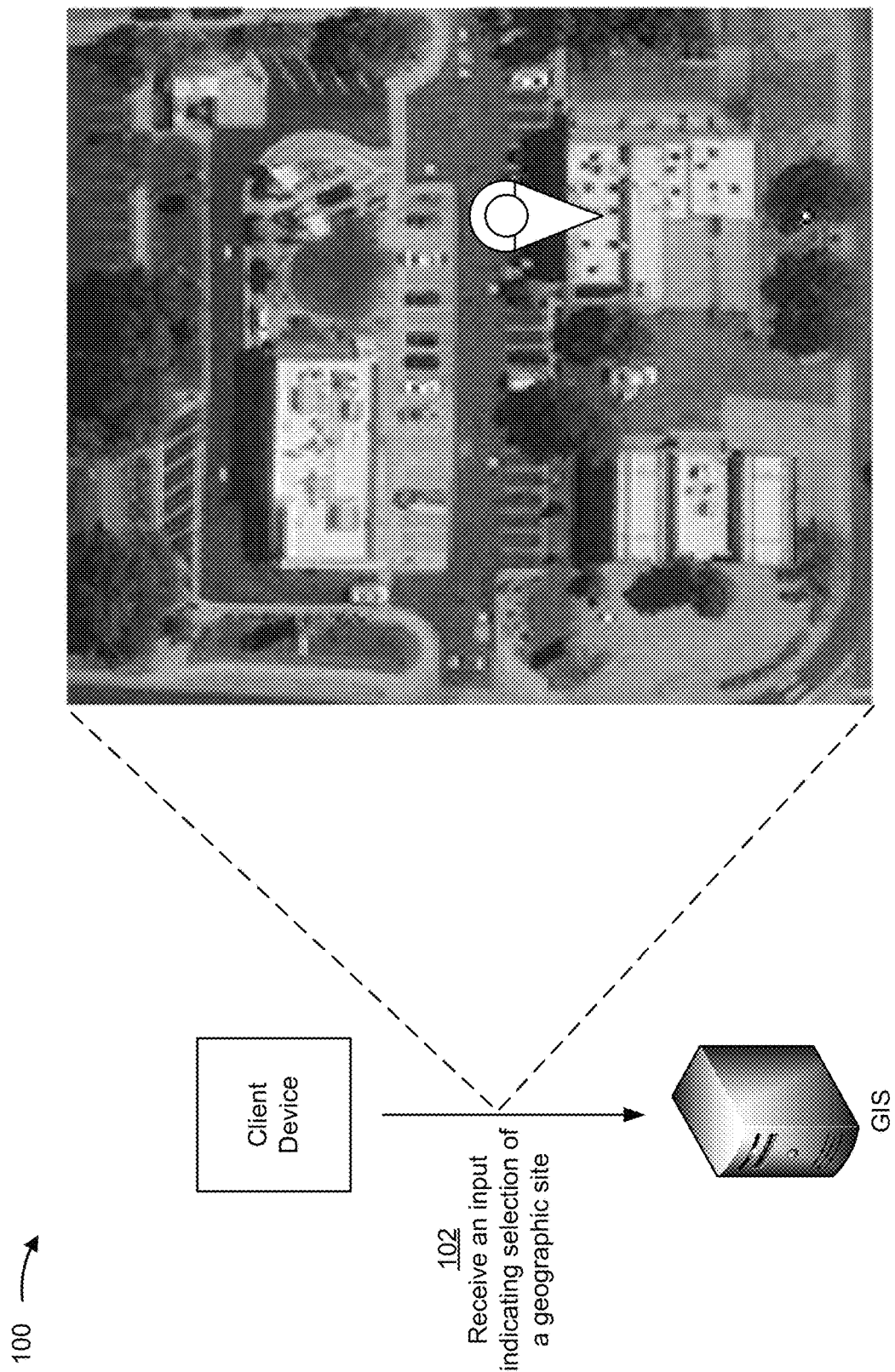

The following detailed description of example implementations refers to the accompanying drawings. The same reference numbers in different drawings can identify the same or similar elements.

A user can use a client device to receive various types of information from a geographic information system (GIS). The information can include information identifying a geographic location, information identifying navigation instructions for navigating from a location of the client device to the geographic location, boundary information associated with the geographic location, and/or the like.

In some cases, a user can use the client device to define a geographic site. In some implementations, a geographic site can include a spatial entity, such as a city, a state, a real estate property, a point of interest, an object (e.g., a building and/or another type of a fixed asset, an entrance to a building, a parking lot, a delivery bay, a playground, and/or the like), and/or the like. The GIS and/or the client device can use the geographic site for navigation (e.g., navigating to and/or from the geographic site), for geofencing (e.g., to trigger events and/or provide notifications regarding the client device entering and/or exiting a geofence associated with the geographic site), and/or the like.

To define a geographic site, a user can provide input, via the client device, that can generally identify the geographic site. The input can include an address associated with the geographic site, can include the user using a touch screen or input device to select a portion of an electronic map or aerial image associated with the geographic site, and/or the like. In some cases, the GIS can attempt to determine the geographic boundaries of the geographic site based on the input. For example, the GIS can generate a predefined polygon, such as a circle with a predefined radius or a square with a predefined dimension, as the boundary of the geographic site. However, the actual boundaries of a geographic site can rarely conform to a predefined polygon. Thus, using predefined polygons to approximate the boundaries of a geographic site can reduce the fidelity of geocoding the boundaries of the geographic sites. Moreover, since geographic sites can be associated with businesses (and many locations within a site of a business), residences, schools, parks, and/or the like, the quantity of geographic sites is potentially in the hundreds of thousands to millions. If predefined polygons are used to identify the boundaries of the geographic sites, the boundaries are likely to overlap which can cause geographic sites to become cluttered and can cause difficulty in distinguishing between the boundaries of geographic sites. Moreover, a user can have to use the client device to maneuver around an electronic map to an area of interest and manually draw boundaries for a geographic site, which can be processing and memory resource intensive since the process can be slow and error prone.

Some implementations described herein provide a GIS that is capable of automatically suggesting geographic site boundaries. In some implementations, the GIS can receive an input indicating selection of a geographic site from a client device. The GIS can automatically suggest boundaries for the geographic site by selecting one or more political boundaries associated with the geographic site, one or more cadastral boundaries associated with the geographic site, and/or one or more aerial images associated with the geographic site, and generating a graphical overlay that includes a visual indication of the one or more political boundaries, a visual indication of the one or more cadastral boundaries, and/or a visual indication of one or more objects identified in the one or more aerial images. The GIS can transmit an instruction to display the overlay on a display of the client device so that the user of the client device can use the overlay as a means for quickly editing and/or selecting the boundaries of the geographic site.

In this way, the overlay, generated by the GIS, can provide more accurate approximations for the boundaries of a geographic site than using predefined polygons to approximate the boundaries of the geographic site, which can permit the GIS to provide more accurate navigation instructions and/or the like. Thus, the overlay, generated by the GIS, can increase the fidelity of geocoding the boundaries of the geographic sites. Moreover, since the quantity of geographic sites is potentially in the hundreds of thousands to millions, the overlay, generated by the GIS, can reduce the likelihood of overlap between boundaries of geographic sites, which in turn reduces clutter in display the geographic sites on electronic maps, aerial images, and/or the like. Moreover, the GIS conserves computer resources because the GIS can use various techniques to navigate the electronic map to quickly identify an area of interest and intelligently draw boundaries in manner that is faster and less error prone.

FIGS. 1A-1D are diagrams of one or more example implementations 100 described herein. As shown in FIGS. 1A-1D, example implementation(s) 100 can include various devices, such as a client device and a GIS.

In some implementations, the client device can be a device capable of communicating with the GIS to receive various types of information, such as location information, mapping information (e.g., information representing an electronic map, aerial images to be overlaid on portions of the electronic map, and/or the like), navigation information (e.g., information identifying one or more navigation directions to a particular location, information identifying a route to a particular location, and/or the like), geographic site information (e.g., information identifying a geographic site, information identifying the boundaries of the geographic site, and/or the like), and/or the like. The client device can include a display to display the various types of information, can include a speaker to provide the various types of information via audio output, and/or the like.

In some implementations, the client device can transmit various types of information to the GIS. For example, the client device can transmit location information associated with the client device (e.g., world geodetic system (WGS) coordinates associated with the client device's geographical location, coordinates associated with the client device's geographical location expressed in another coordinate system, and/or the like), one or more queries (e.g., a query for navigation directions to a particular location, a query for information identifying an intersection of two or more roads, and/or the like), one or more inputs (e.g., an input indicating selection of a geographic site, an input identifying a selection of a geographic site boundary for the geographic site, an input identifying a geographical location, and/or the like), and/or the like.

In some implementations, the GIS can communicate with the client device to receive the location information, the one or more queries, the one or more inputs, and/or the like. For example, the GIS can receive an input that indicates selection of a geographic site. In some implementations, the GIS can automatically generate an overlay that includes one or more suggested boundaries for the geographic site, and can provide, the overlay and an instruction to display the overlay.

As shown in FIG. 1A, and by reference number 102, the client device can transmit the input to the GIS. In some implementations, the client device can transmit the input based on receiving the input from the user. The input can include an indication of an address associated with the geographic site, can include the user using a touch screen or input device associated with the client device to select a portion of an electronic map or aerial image associated with the geographic site (e.g., which can be indicated, in the input, as a set of geographic coordinates), can include an indication of a point of interest (e.g., a name of a point of interest), can include an indication of an intersection at or near the geographic site, can include an indication of a road, street, and/or the like associated with the geographic site, and/or the like.

In the example illustrated in FIG. 1A, the user has selected a portion of an aerial image as the selection of geographic site. The aerial image can be a stand-alone aerial image or can be an aerial image that is overlaid on an electronic map (or the electronic map can be overlaid on the aerial image).

Figure 1B:
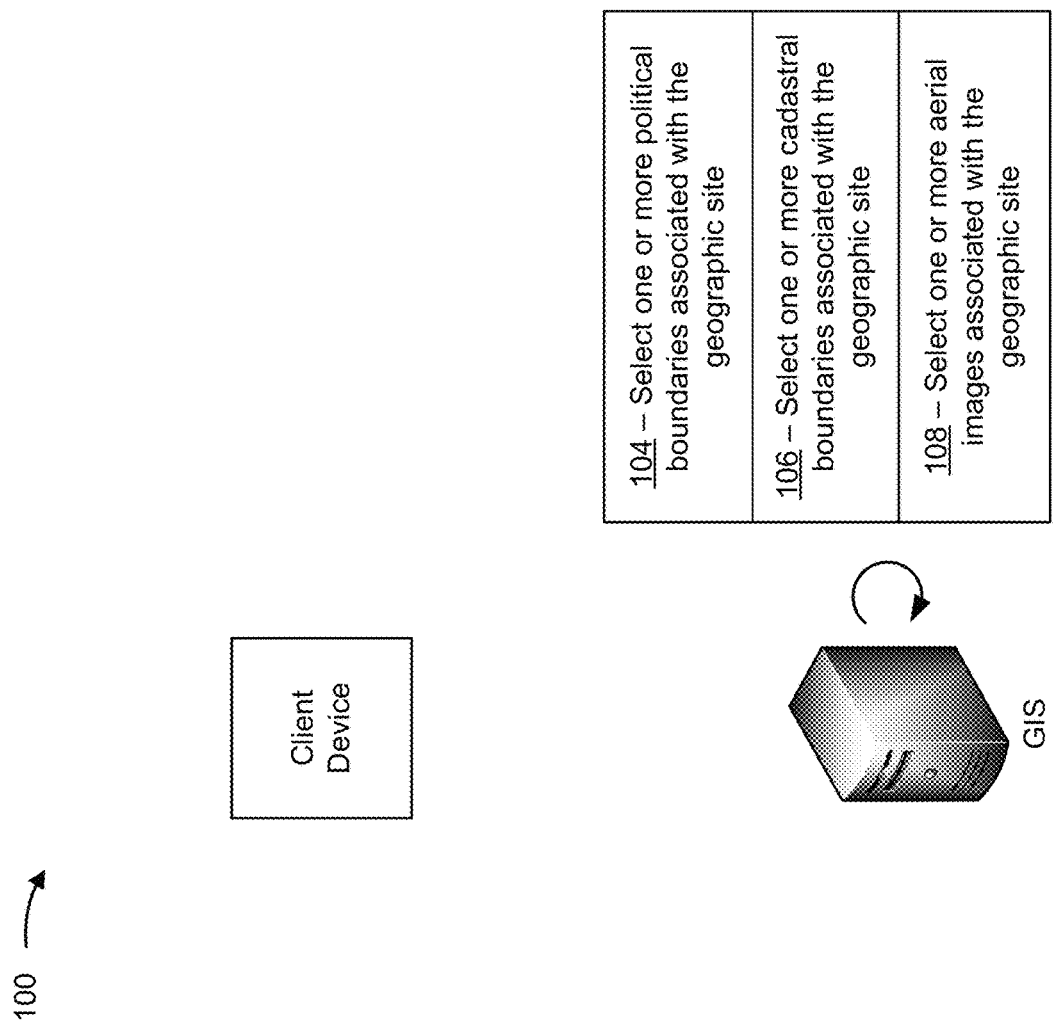

As shown in FIG. 1B, the GIS can receive the input and can select various types of boundaries to automatically suggest boundaries for the geographic site. As shown by reference number 104, the GIS can select one or more political boundaries associated with the geographic site. A political boundary can include a geographic boundary associated with a political entity, such as a state, a city, a suburb, a county, a postal code (or Zipcode), a homeowner's association (HOA), and/or the like. In some implementations, the GIS can identify the one or more political boundaries by searching a geocoding data structure, such as a geocoding database, a mapping database, and/or the like.

In some implementations, if the input includes an address associated with the geographic site, the GIS can identify the one or more political boundaries based on determining that the address is associated with the one or more political boundaries, based on determining that the address is located within the one or more political boundaries, and/or the like. In some implementations, if the input includes an indication of geographic coordinates associated with the geographic site, an indication of a point of interest, an indication of an intersection, a road, a street, and/or the like, the GIS can identify the one or more political boundaries based on determining that the geographic coordinates, point of interest, intersection, road, street, and/or the like, is located within the one or more political boundaries.

If the geographic platform determines that the geographic site is associated with, and/or included in, the one or more political boundaries, the geographic platform can determine whether the one or more political boundaries are viewable on the display of the client device. In some implementations, the geographic platform can select the one or more political boundaries based on determining that the one or more political boundaries are entirely viewable (e.g., the entire outline of a political boundary is viewable on the display of the client device) on the display of the client device. In this way, if a political boundary is entirely viewable on the display of the client device, the GIS can use this as an indication that the user might have intended to select the political boundary as the geographic site boundary of the geographic site. In some implementations, the geographic platform can select a political boundary based on determining that a percentage of the political boundary viewable on the display of the client device satisfies a threshold percentage (e.g., 80%, 90%, and/or the like).

As further shown in FIG. 1B, and by reference number 106, the GIS can select one or more cadastral boundaries associated with the geographic site. A cadastral boundary can include a geographic boundary associated with a parcel of real estate, a real estate tract, and/or the like. In some implementations, the GIS can determine a cadastral boundary for a parcel of real estate, a real estate tract, and/or the like by searching one or more real estate recordings or record databases for a legal description of the parcel of real estate, the real estate tract, and/or the like.

In some implementations, if the input includes an address associated with the geographic site, the GIS can identify the one or more cadastral boundaries based on determining that the address is associated with the one or more cadastral boundaries, based on determining that the address is located within the one or more cadastral boundaries, and/or the like. In some implementations, if the input includes an indication of geographic coordinates associated with the geographic site or an indication of a point of interest, the GIS can identify the one or more cadastral boundaries based on determining that the geographic coordinates or point of interest is located within the one or more cadastral boundaries. In some implementations, if the input includes an indication of an intersection, a road, a street, and/or the like, the GIS can identify the one or more cadastral boundaries based on determining that the intersection, the road, the street, and/or the like, is located adjacent to the intersection, the road, the street, and/or the like.

If the geographic platform determines that the geographic site is associated with, and/or included in, the one or more cadastral boundaries, the geographic platform can determine whether the one or more cadastral boundaries are viewable on the display of the client device. In some implementations, the geographic platform can select the one or more cadastral boundaries based on determining that the one or more cadastral boundaries are entirely viewable (e.g., the entire outline of a cadastral boundary is viewable on the display of the client device) on the display of the client device. In this way, if a cadastral boundary is entirely viewable on the display of the client device, the GIS can use this as an indication that the user might have intended to select the cadastral boundary as the geographic site boundary of the geographic site. In some implementations, the geographic platform can select a cadastral boundary based on determining that a percentage of the cadastral boundary viewable on the display of the client device satisfies a threshold percentage (e.g., 80%, 90%, and/or the like).

As further shown in FIG. 1B, and by reference number 108, the GIS can select one or more aerial images associated with the geographic site. An aerial image can include an over-head or top-down view of a portion of a geographic area. An aerial image can be captured by a satellite, by an airborne device such as a drone, a manned or unmanned helicopter, and/or the like.

In some implementations, the GIS can select the one or more aerial images by identifying one or more aerial images in which the geographic site, selected by the user, is viewable. For example, the GIS can search a geocoding data structure, an aerial image data structure, another data structure, and/or the like, to identify one or more aerial images that are coded and/or otherwise associated with the address associated with the geographic site, that are coded and/or otherwise associated with the geographic coordinates associated with the geographic site, and/or the like. In some implementations, the GIS can select the one or more aerial images based on determining that the one or more political boundaries, associated with the geographic site, are viewable in the one or more aerial images. In some implementations, the GIS can select the one or more aerial images based on determining that the one or more cadastral boundaries, associated with the geographic site, are viewable in the one or more aerial images.

As shown in FIG. 1C, and by reference number 110, the GIS can generate an overlay based on the one or more political boundaries associated with the geographic site, the one or more cadastral boundaries associated with the geographic site, and/or one or more aerial images associated with the geographic site. The overlay can include a visual indication of the one or more political boundaries, a visual indication of the one or more cadastral boundaries, and/or a visual indication of object boundaries associated with one or more objects identified in the one or more aerial images. In some implementations, and as shown in the example overlay illustrated in FIG. 1C, a visual indication can include a graphical border around a boundary. In some implementations, a visual indication can include a tag associated with a boundary, a semi-transparent highlight of the boundary, and/or the like. While the example overlay illustrated in FIG. 1C shows a visual indication of a cadastral boundary and a visual indication of a plurality of object boundaries, visual indications for other types of boundaries and/or combinations of boundaries can be included in an overlay that can be generated using the techniques described herein.

In some implementations, the one or more objects can include a building and/or another type of a fixed asset, an entrance to a building, a parking lot, a delivery bay, a playground, and/or the like. The GIS can identify the one or more objects, and determine the object boundaries associated with the one or more objects, using various image recognition techniques, such as one or more image segmentation techniques.

As an example, the GIS can use Canny edge detection to identify areas of contrast change (edges) in an aerial image. The Canny edge detection can convert the aerial image into a black and white image in which contrast edges are indicated in white and gaps between edges can be indicated in black. The GIS can use morphological thinning to convert the edges from various widths to 1-pixel wide forms. In some implementations, the GIS can filter any small gaps using a distance threshold (e.g., by connecting gaps that are less than a threshold quantity of pixels apart). The GIS can iterate over the edges, looking for connected loops (e.g., edges that have a complete and connected path from a particular point). The GIS can trim the loops of any spurs to simplify the shapes of the loops (e.g., using an algorithm such as a Douglas-Peucker algorithm and/or the like). The GIS can perform a sampling of the original color pixels included within the loops, and can reject loops that do not have enough similarity (e.g., expressed as a statistical measure) between the colors included therein. This helps ensure the objects identified by the GIS are visually consistent. In some implementations, the GIS can eliminate and/or reject any objects that are below or above a particular threshold size. Additionally and/or alternatively, the GIS can eliminate and/or reject any objects that are too long/narrow or irregular (measured by the ratio of their perimeter to their area). In some implementations, the GIS can determine that one or more contrast gradients are associated with an object based on the shape of the object being symmetrical, having sharp corners and/or straight sides, and/or generally being indicative of the object being artificial and/or mand-made.

In some implementations, the GIS can identify the one or more objects, and determine the object boundaries associated with the one or more objects, using machine learning and/or artificial intelligence in addition to, or instead of, the techniques described above. For example, the GIS can train a machine learning model based on political boundaries, cadastral boundaries, and/or aerial images with seed sets of object boundaries that have been properly identified. The machine learning model can then be used to estimate object boundaries based on political boundaries, cadastral boundaries, and/or aerial images. Moreover, the client device can provide feedback to the GIS regarding the accuracy of the object boundaries included in the overlay, which in turn can be used to further train and improve the accuracy of the machine learning model.

In some implementations, the GIS can identify the one or more objects based on differences in color in the one or more aerial images. For example, the GIS can distinguish between areas of different color (e.g., dark grey for a parking lot and green for a park) to identify man-made objects from natural landscape, to identify different man-made objects (e.g., to distinguish between the top of a building and a parking lot), to identify unimproved land from natural areas that have been purposed at parks or other outdoor recreational areas, and/or the like.

As further shown in FIG. 1C, and by reference number 112, the GIS can transmit, to the client device, the overlay and an instruction to display the overlay on the display of the client device. The client device can display the overlay on at least a portion of an aerial image (e.g., on an aerial image of the one or more aerial images, associated with the geographic site, selected by the GIS), on at least a portion of an electronic map display, and/or the like. In this way, the GIS and the client device can permit the user of the client device to view the overlay and determine which (if any) of the boundaries included in the overlay is an accurate and/or desired representation of the geographic site boundary of the geographic site.

In some implementations, if the user determines that a boundary included in the overlay is an accurate and/or desired representation of the geographic site boundary of the geographic site, the user can provide input, to the client device, indicating selection of the boundary as the geographic site boundary for the geographic site. For example, the user can use a touch screen or input device to click on the boundary, to highlight the boundary, and/or other means to select the boundary. As an example, if the user selected the geographic site to generate a boundary for a particular delivery location within a corporate site, the user can select the object boundary associated with the delivery location (e.g., the building at which the delivery location is located).

In some implementations, if the user determines none of the boundaries included in the overlay are an accurate and/or desired representation of the geographic site boundary of the geographic site, the user can use the client device to modify a boundary included in the overlay. In this way, the user can use the boundary as a starting point for selecting the geographic site boundary of the geographic site. The user can modify the boundary by increasing the size of the boundary, by modifying the shape of the boundary, by modifying the location of the boundary, and/or the like.

Figure 1D:
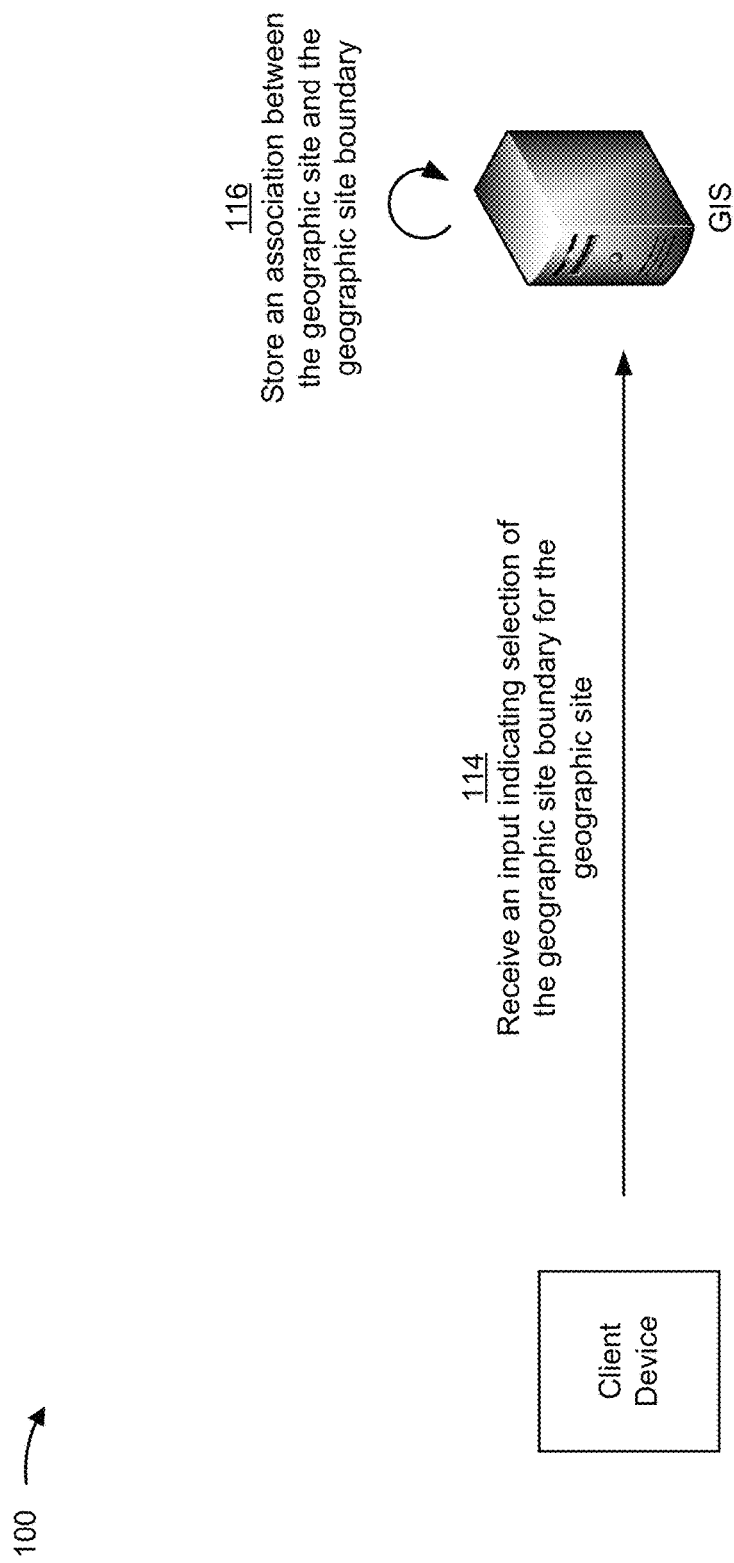

As shown in FIG. 1D, and by reference number 114, the client device can transmit, to the GIS, an input indicating selection of the geographic site boundary associated with the geographic site. In some implementations, the client device can transmit the input to the GIS based on receiving the input from the user. In some implementations, the selection of the geographic site boundary can include a political boundary of the one or more political boundaries, a cadastral boundary of one or more cadastral boundaries, an object boundary associated with an object of the one or more objects identified in the one or more aerial images. In some implementations, the selection of the geographic site boundary can include a political boundary of the one or more political boundaries, a cadastral boundary of one or more cadastral boundaries, an object boundary associated with an object of the one or more objects identified in the one or more aerial images.

As further shown in FIG. 1D, and by reference number 116, the GIS can receive the indication of the geographic site boundary and can store information identifying the geographic site boundary and an association between the geographic site boundary and the geographic site in the geocoding data structure. In some implementations, the association between the geographic site boundary and the geographic site can be included in metadata associated with an electronic map segment and/or aerial image, can be included in a structured data file (e.g., an extensible markup language (XML) file, JavaScript object notation (JSON) file) associated with the electronic map segment and/or aerial image, and/or the like.

In some implementations, the GIS can use the association between the geographic site boundary and the geographic site to satisfy queries associated with the geographic site (e.g., a query to display the geographic site boundary on an electronic map and/or aerial image), can use the association between the geographic site boundary and the geographic site to provide navigation instructions associated with the geographic site (e.g., to provide navigation directions to and/or from the geographic site), can use the association between the geographic site boundary and the geographic site to provide geofencing associated with the geographic site (e.g., to provide notifications for when a device enters and/or exits the geographic site boundary), and/or the like.

In this way, the GIS can receive an input indicating selection of a geographic site from the client device. The GIS can automatically suggest boundaries for the geographic site by selecting one or more political boundaries associated with the geographic site, one or more cadastral boundaries associated with the geographic site, and/or one or more aerial images associated with the geographic site, and generating a graphical overlay that includes a visual indication of the one or more political boundaries, a visual indication of the one or more cadastral boundaries, and/or a visual indication of one or more objects identified in the one or more aerial images. The GIS can transmit an instruction to display the overlay on a display of the client device so that the user of the client device can use the overlay as a means for quickly editing and/or selecting the boundaries of the geographic site.

In this way, the overlay, generated by the GIS, can provide more accurate approximations for the boundaries of a geographic site than using predefined polygons to approximate the boundaries of the geographic site. Thus, the overlay, generated by the GIS, can increase the fidelity of geocoding the boundaries of the geographic sites. Moreover, since the quantity of geographic sites is potentially in the hundreds of thousands to millions, the overlay, generated by the GIS, can reduce the likelihood of overlap between boundaries of geographic sites, which in turn reduces clutter in display the geographic sites on electronic maps, aerial images, and/or the like.

As indicated above, FIGS. 1A-1D is provided as one or more examples. Other examples can differ from what is described with regard to FIGS. 1A-1D.

Figure 2:
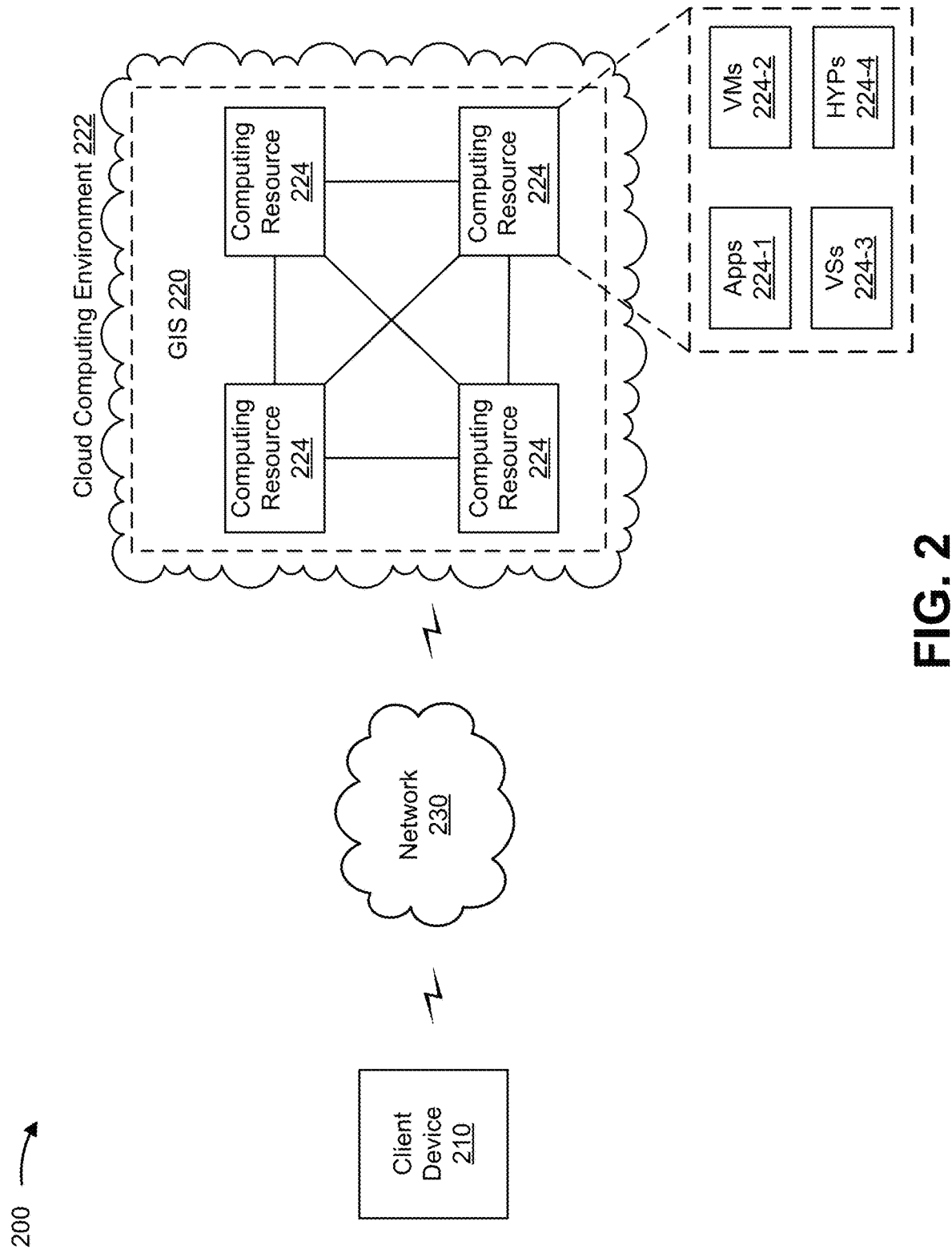
FIG. 2 is a diagram of an example environment in which systems and/or methods described herein can be implemented.

FIG. 2 is a diagram of an example environment 200 in which systems and/or methods, described herein, can be implemented. As shown in FIG. 2, environment 200 can include a client device 210, a GIS 220, a cloud computing environment 222, a computing resource 224, and a network 240. Devices of environment 200 can interconnect via wired connections, wireless connections, or a combination of wired and wireless connections.

Client device 210 includes one or more devices capable of receiving, generating, storing, processing, and/or providing information associated with automated identification of geographic site boundaries. For example, client device 210 can include a communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), and/or a similar type of device.

In some implementations, client device 210 can be a device capable of communicating with GIS 220 to receive various types of information, such as location information, mapping information (e.g., information representing an electronic map, aerial images to be overlaid on portions of the electronic map, and/or the like), navigation information (e.g., information identifying one or more navigation directions to a particular location, information identifying a route to a particular location, and/or the like), geographic site information (e.g., information identifying a geographic site, information identifying a geographic site boundary of the geographic site, and/or the like), and/or the like.

In some implementations, client device 210 can transmit various types of information to GIS 220. For example, the client device can transmit location information associated with client device 210, one or more queries (e.g., a query for navigation directions to a particular location, a query for information identifying an intersection of two or more roads, and/or the like), one or more inputs (e.g., an input identifying a geographic site, an input identifying a selection of a geographic site boundary for the geographic site, and/or the like), and/or the like.

GIS 220 includes one or more computing resources capable of receiving, generating, storing, processing, and/or providing data associated with automated identification of geographic site boundaries. For example, GIS 220 can be a platform implemented by cloud computing environment 222. In some implementations, GIS 220 is implemented by computing resources 224 of cloud computing environment 222. In some implementations, GIS 220 can receive, from client device 210, an input indicating selection of a geographic site, can select, based on receiving the input, one or more political boundaries associated with the geographic site, one or more cadastral boundaries associated with the geographic site, and/or one or more aerial images associated with the geographic site, can generate an overlay that includes a visual indication of the one or more political boundaries, a visual indication of the one or more cadastral boundaries, and/or a visual indication of one or more objects identified in the one or more aerial images, can transmit, to client device 210, an instruction to display the overlay, and/or the like.

In some implementations, GIS 220 can receive, from client device 210 and based on transmitting the instruction to display the overlay, another input indicating selection of a geographic site boundary for the geographic site, can store, in a geocoding data structure, an association between the geographic site and the geographic site boundary, and/or the like. In some implementations, the geocoding data structure can be included in GIS 220 and/or can be included in another device.

Cloud computing environment 222 includes an environment that hosts GIS 220. Cloud computing environment 222 can provide computation, software, data access, storage, and/or other services that do not require end-user knowledge of a physical location and configuration of a system and/or a device that delivers the services. As shown, cloud computing environment 222 can include GIS 220 and computing resource 225.

Computing resource 224 includes one or more personal computers, workstation computers, server devices, or another type of computation and/or communication device. In some implementations, computing resource 224 can host GIS 220. The cloud resources can include compute instances executing in computing resource 224, storage devices provided in computing resource 224, data transfer devices provided by computing resource 224, and/or the like. In some implementations, computing resource 224 can communicate with other computing resources 224 via wired connections, wireless connections, or a combination of wired and wireless connections.

As further shown in FIG. 2, computing resource 224 can include a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that can be provided to or accessed by client device 210. Application 224-1 can eliminate a need to install and execute the software applications on client device 210. For example, application 224-1 can include software associated with GIS 220 and/or any other software capable of being provided via cloud computing environment 222. In some implementations, one application 224-1 can send/receive information to/from one or more other applications 224-1, via virtual machine 224-2.

Virtual machine 224-2 includes a software implementation of a machine (e.g., a computer) that executes programs like a physical machine. Virtual machine 224-2 can be either a system virtual machine or a process virtual machine, depending upon use and degree of correspondence to any real machine by virtual machine 224-2. A system virtual machine can provide a complete system platform that supports execution of a complete operating system ("OS"). A process virtual machine can execute a single program, and can support a single process. In some implementations, virtual machine 224-2 can execute on behalf of a user (e.g., a user of client device 210), and can manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 224-4 provides hardware virtualization techniques that allow multiple operating systems (e.g., "guest operating systems") to execute concurrently on a host computer, such as computing resource 224. Hypervisor 224-4 can present a virtual operating platform to the guest operating systems, and can manage the execution of the guest operating systems. Multiple instances of a variety of operating systems can share virtualized hardware resources.

Network 230 includes one or more wired and/or wireless networks. For example, network 230 can include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
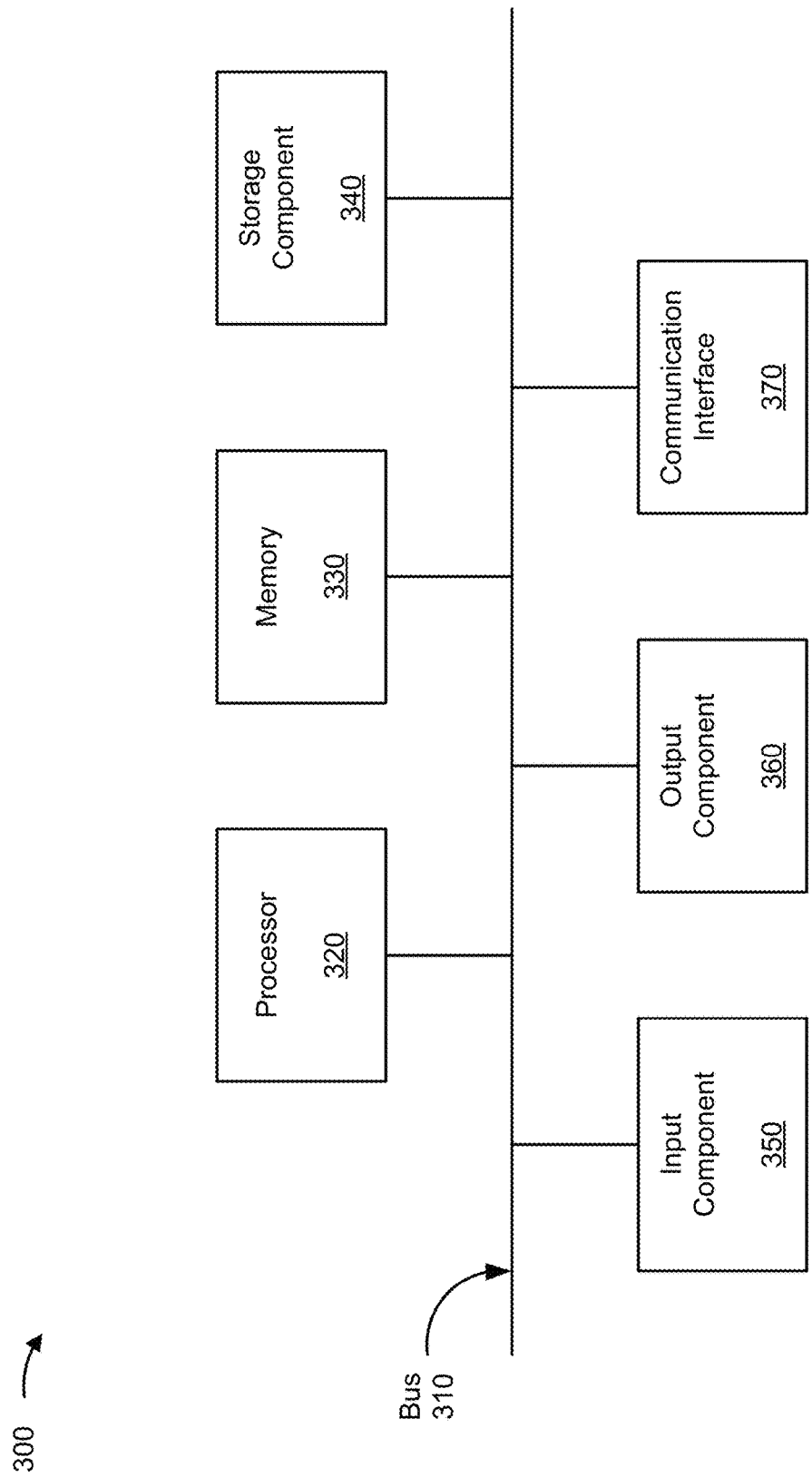
FIG. 3 is a diagram of example components of one or more devices of FIG. 2.

FIG. 3 is a diagram of example components of a device 300. Device 300 can correspond to client device 210, GIS 220, computing resource 224, and/or one or more devices included in network 230. In some implementations, client device 210, GIS 220, computing resource 224, and/or one or more devices included in network 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardware circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3.

Additionally, or alternatively, a set of components (e.g., one or more components) of device 300 can perform one or more functions described as being performed by another set of components of device 300.

Figure 4:
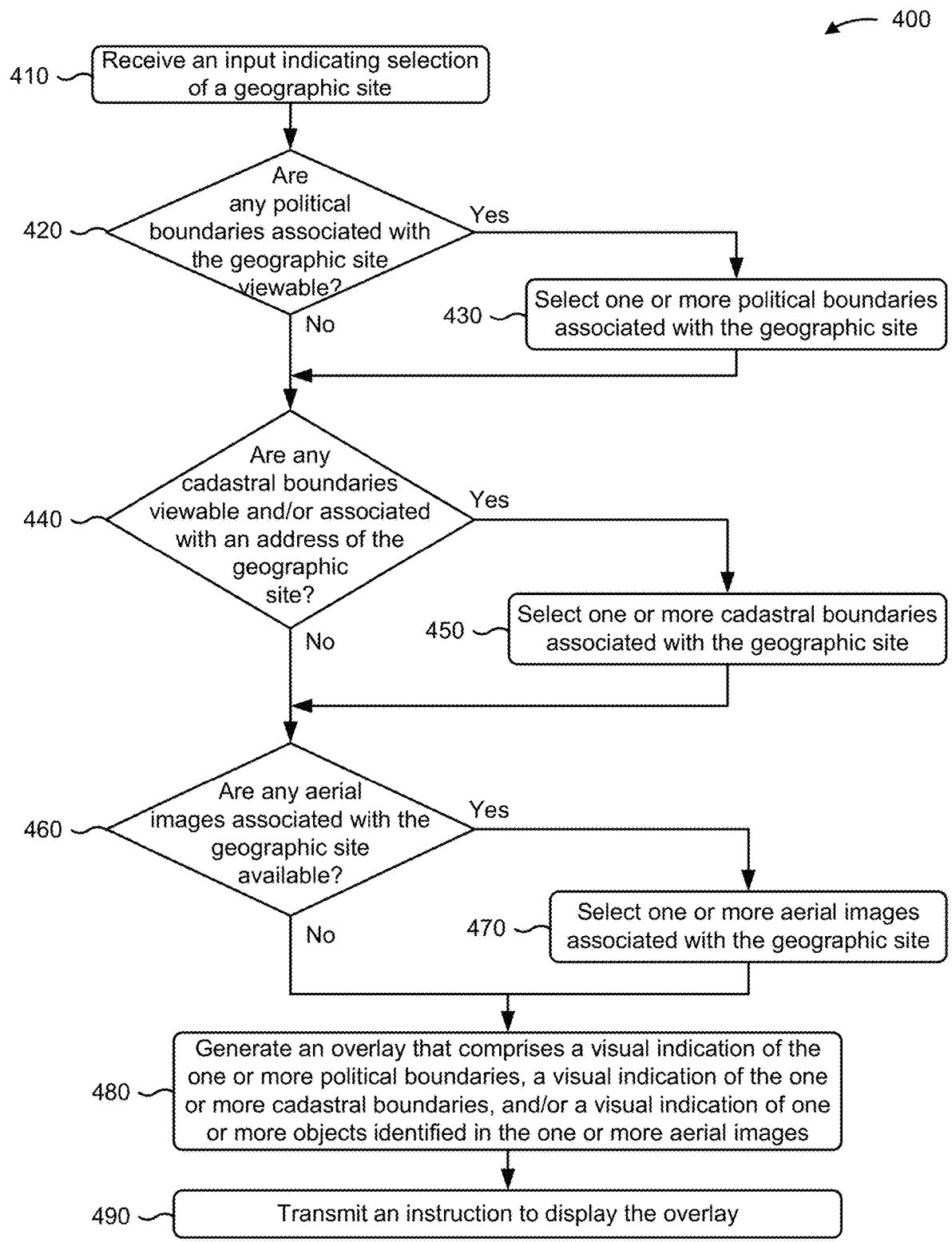
FIG. 4 is a flow chart of an example process for automated identification of geographic site boundaries.

FIG. 4 is a flow chart of an example process 400 for automated identification of geographic site boundaries. In some implementations, one or more process blocks of FIG. 4 can be performed by a GIS (e.g., GIS 220). In some implementations, one or more process blocks of FIG. 4 can be performed by another device or a group of devices separate from or including the GIS, such as a client device (e.g., client device 210) and/or the like.

As shown in FIG. 4, process 400 can include receiving, from a client device, an input indicating selection of a geographic site (block 410). For example, the GIS (e.g., using computing resource 224, processor 320, memory 330, storage component 340, input component 350, output component 360, communication interface 370 and/or the like) can receive, from a client device, an input indicating selection of a geographic site, as described above.

As further shown in FIG. 4, process 400 can include determining, based on receiving the input, whether any political boundaries, associated with the geographic site, are viewable on a display of the client device (block 420). For example, the GIS (e.g., using computing resource 224, processor 320, memory 330, storage component 340, input component 350, output component 360, communication interface 370 and/or the like) can determine, based on receiving the input, whether any political boundaries, associated with the geographic site, are viewable on a display of the client device, as described above.

As further shown in FIG. 4, if the GIS determines that one or more political boundaries, associated with the geographic site, are viewable on the display of the client device (block 420-Yes), process 400 can include selecting the one or more political boundaries associated with the geographic site (block 430). For example, the GIS (e.g., using computing resource 224, processor 320, memory 330, storage component 340, input component 350, output component 360, communication interface 370 and/or the like) can select the one or more political boundaries associated with the geographic site, as described above.

As further shown in FIG. 4, process 400 can include determining, based on receiving the input, whether any cadastral boundaries, associated with the geographic site, are viewable on a display of the client device and/or are associated with an address of the geographic site (block 440). For example, the GIS (e.g., using computing resource 224, processor 320, memory 330, storage component 340, input component 350, output component 360, communication interface 370 and/or the like) can determine, based on receiving the input, whether any cadastral boundaries, associated with the geographic site, are viewable on a display of the client device and/or are associated with an address of the geographic site, as described above.

As further shown in FIG. 4, if the GIS determines that one or more cadastral boundaries, associated with the geographic site, are viewable on a display of the client device and/or are associated with an address of the geographic site (block 440-Yes), process 400 can include selecting the one or more cadastral boundaries associated with the geographic site (block 450). For example, the GIS (e.g., using computing resource 224, processor 320, memory 330, storage component 340, input component 350, output component 360, communication interface 370 and/or the like) can select the one or more cadastral boundaries associated with the geographic site, as described above.

As further shown in FIG. 4, process 400 can include determining, based on receiving the input, whether any aerial images, associated with the geographic site, are available (block 460). For example, the GIS (e.g., using computing resource 224, processor 320, memory 330, storage component 340, input component 350, output component 360, communication interface 370 and/or the like) can determine, based on receiving the input, whether any aerial images, associated with the geographic site, are available, as described above.

As further shown in FIG. 4, if the GIS determines that one or more aerial images, associated with the geographic site, are available (block 460-Yes), process 400 can include selecting the one or more aerial images associated with the geographic site (block 470). For example, the GIS (e.g., using computing resource 224, processor 320, memory 330, storage component 340, input component 350, output component 360, communication interface 370 and/or the like) can select the one or more aerial images associated with the geographic site, as described above.

As further shown in FIG. 4, process 400 can include generating an overlay that comprises a visual indication of the one or more political boundaries, a visual indication of the one or more cadastral boundaries, and/or a visual indication of one or more objects identified in the one or more aerial images (block 480). For example, the GIS (e.g., using computing resource 224, processor 320, memory 330, storage component 340, input component 350, output component 360, communication interface 370 and/or the like) can generate an overlay that comprises a visual indication of the one or more political boundaries, a visual indication of the one or more cadastral boundaries, and/or a visual indication of one or more objects identified in the one or more aerial images, as described above.

As further shown in FIG. 4, process 400 can include transmitting, by the GIS and to the client device, an instruction to display the overlay (block 490). For example, the GIS (e.g., using computing resource 224, processor 320, memory 330, storage component 340, input component 350, output component 360, communication interface 370 and/or the like) can transmit, by the GIS and to the client device, an instruction to display the overlay, as described above.

Process 400 can include additional implementations, such as any single implementation or any combination of implementations described below and/or in connection with one or more other processes described elsewhere herein.

In some implementations, process 400 comprises determining, based on the input, whether the one or more political boundaries are entirely viewable on a display of the client device, and selecting the one or more political boundaries comprises selecting the one or more political boundaries based on determining that the one or more political boundaries are entirely viewable on the display of the client device and determining that the geographic site is located within the one or more political boundaries. In some implementations, the input comprises an address associated with the geographic site, and selecting the one or more cadastral boundaries comprises selecting the one or more cadastral boundaries comprises determining that the address is associated with the one or more cadastral boundaries and selecting the one or more cadastral boundaries based on determining that the address is associated with the one or more cadastral boundaries.

In some implementations, process 400 comprises determining, based on the input, whether the one or more cadastral boundaries are entirely viewable on a display of the client device, and selecting the one or more cadastral boundaries comprises selecting the one or more cadastral boundaries based on determining that the one or more cadastral boundaries are entirely viewable on the display of the client device and determining that the geographic site is located within the one or more cadastral boundaries. In some implementations, process 400 comprises identifying the one or more objects in the one or more aerial images based on at least one of shapes of the one or more objects in the one or more aerial images, contrast, in the one or more aerial images, associated with the one or more objects, or differences in color in the one or more aerial images.

In some implementations, process 400 comprises receiving, based on transmitting the instruction to display the overlay, another input indicating selection of a geographic site boundary for the geographic site, the geographic site boundary comprising a political boundary of the one or more political boundaries, a cadastral boundary of one or more cadastral boundaries, or, an object boundary associated with an object of the one or more objects identified in the one or more aerial images, and storing, in a geocoding data structure, an association between the geographic site and the geographic site boundary.

In some implementations, process 400 comprises receiving, based on transmitting the instruction to display the overlay, another input indicating selection of a geographic site boundary for the geographic site, the geographic site boundary comprising a user-modified political boundary of the one or more political boundaries, a user-modified cadastral boundary of one or more cadastral boundaries, or a user-modified object boundary associated with an object of the one or more objects identified in the one or more aerial images, and storing, in a geocoding data structure, an association between the geographic site and the geographic site boundary.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, at a geographic information system (GIS) and from a client device, an input indicating selection of a geographic site;
   selecting, by the GIS and based on receiving the input:
      one or more political boundaries associated with the geographic site,
      one or more cadastral boundaries associated with the geographic site, and
      one or more aerial images associated with the geographic site;
   generating, by the GIS, an overlay that comprises:
      a visual indication of the one or more political boundaries,
      a visual indication of the one or more cadastral boundaries, and
      a visual indication of one or more objects identified in the one or more aerial images,
         wherein the one or more objects are identified using a machine learning model, trained based on political boundaries, cadastral boundaries, and/or aerial images with seed sets of object boundaries that have been identified, to estimate object boundaries based on the identified political boundaries, identified cadastral boundaries, and/or identified aerial images;
   transmitting, by the GIS and to the client device, an instruction to display the overlay;
   receiving, by the GIS and based on transmitting the instruction to display the overlay, another input indicating selection of a geographic site boundary for the geographic site; and
   modifying, by the GIS and based on receiving the other input, a shape of the geographic site boundary in the overlay from a predefined shape to a user-defined shape.

2. The method of claim 1, further comprising:
   determining, based on the input, whether the one or more political boundaries are entirely viewable on a display of the client device; and
   wherein selecting the one or more political boundaries comprises:
      selecting the one or more political boundaries based on:
         determining that the one or more political boundaries are entirely viewable on the display of the client device, and
         determining that the geographic site is located within the one or more political boundaries.

3. The method of claim 1, wherein the input comprises:
   an address associated with the geographic site; and
   wherein selecting the one or more cadastral boundaries comprises:
      determining that the address is associated with the one or more cadastral boundaries; and
      selecting the one or more cadastral boundaries based on determining that the address is associated with the one or more cadastral boundaries.

4. The method of claim 1, further comprising:
   determining, based on the input, whether the one or more cadastral boundaries are entirely viewable on a display of the client device; and
   wherein selecting the one or more cadastral boundaries comprises:
      selecting the one or more cadastral boundaries based on determining that the one or more cadastral boundaries are entirely viewable on the display of the client device, and
      determining that the geographic site is located within the one or more cadastral boundaries.

5. The method of claim 1, further comprising:
   identifying the one or more objects in the one or more aerial images based on at least one of:
      shapes of the one or more objects in the one or more aerial images,
      contrast, in the one or more aerial images, associated with the one or more objects, or
      differences in color in the one or more aerial images.

6. The method of claim 1,
   wherein the geographic site boundary comprises:
      a political boundary of the one or more political boundaries,
      a cadastral boundary of one or more cadastral boundaries, or
      an object boundary associated with an object of the one or more objects identified in the one or more aerial images; and

17 wherein the method further comprises:
    storing, in a geocoding data structure, an association between the geographic site and the geographic site boundary.
7. The method of claim 1,
wherein the geographic site boundary comprises:
    a user-modified political boundary of the one or more political boundaries,
    a user-modified cadastral boundary of one or more cadastral boundaries, or
    a user-modified object boundary associated with an object of the one or more objects identified in the one or more aerial images; and
wherein the method further comprises:
    storing, in a geocoding data structure, an association between the geographic site and the geographic site boundary.
8. A geographic information system (GIS), comprising:
one or more memories; and
one or more processors communicatively coupled to the one or more memories, to:
    receive, from a client device, an input indicating selection of a geographic site;
    select, based on receiving the input:
        one or more political boundaries associated with the geographic site,
        one or more cadastral boundaries associated with the geographic site, and
        one or more aerial images associated with the geographic site;
    generate an overlay that comprises:
        a visual indication of the one or more political boundaries,
        a visual indication of the one or more cadastral boundaries, and
        a visual indication of one or more objects identified in the one or more aerial images,
            wherein the one or more objects are identified using a machine learning model, trained based on political boundaries, cadastral boundaries, and/or aerial images with seed sets of object boundaries that have been identified, to estimate object boundaries based on the identified political boundaries, identified cadastral boundaries, and/or identified aerial images;
    transmit, to the client device, an instruction to display the overlay;
    receive, based on transmitting the instruction to display the overlay, another input indicating selection of a geographic site boundary for the geographic site;
    modify, based on receiving the other input, a shape of the geographic site boundary in the overlay from a predefined shape to a user-defined shape.
9. The GIS of claim 8, wherein the one or more processors are further configured to:
    determine, based on the input, whether the one or more political boundaries are entirely viewable on a display of the client device; and
    wherein the one or more processors, when selecting the one or more political boundaries, are to:
        select the one or more political boundaries based on:
            determining that the one or more political boundaries are entirely viewable on the display of the client device, and
            determining that the geographic site is located within the one or more political boundaries.

18

10. The GIS of claim 8, wherein the input comprises:
    an address associated with the geographic site; and
    wherein the one or more processors, when selecting the one or more cadastral boundaries, are to:
        determine that the address is associated with the one or more cadastral boundaries; and
        select the one or more cadastral boundaries based on determining that the address is associated with the one or more cadastral boundaries.
11. The GIS of claim 8, wherein the one or more processors are further configured to:
    determine, based on the input, whether the one or more cadastral boundaries are entirely viewable on a display of the client device; and
    wherein the one or more processors, when selecting the one or more cadastral boundaries, are to:
        select the one or more cadastral boundaries based on:
            determine that the one or more cadastral boundaries are entirely viewable on the display of the client device, and
            determine that the geographic site is located within the one or more cadastral boundaries.
12. The GIS of claim 8, wherein the one or more processors are further configured to:
    identify the one or more objects in the one or more aerial images based on at least one of:
        shapes of the one or more objects in the one or more aerial images,
        contrast, in the one or more aerial images, associated with the one or more objects, or
        differences in color in the one or more aerial images.
13. The GIS of claim 8,
wherein the geographic site boundary comprises:
    a political boundary of the one or more political boundaries,
    a cadastral boundary of one or more cadastral boundaries, or
    an object boundary associated with an object of the one or more objects identified in the one or more aerial images; and
wherein the one or more processors are further configured to:
    store, in a geocoding data structure, an association between the geographic site and the geographic site boundary.
14. The GIS of claim 8,
wherein the geographic site boundary comprises:
    a user-modified political boundary of the one or more political boundaries,
    a user-modified cadastral boundary of one or more cadastral boundaries, or
    a user-modified object boundary associated with an object of the one or more objects identified in the one or more aerial images; and
wherein the one or more processors are further configured to:
    store, in a geocoding data structure, an association between the geographic site and the geographic site boundary.
15. A non-transitory computer-readable medium storing instructions, the instructions comprising:
    one or more instructions that, when executed by one or more processors of a geographic information system (GIS), cause the one or more processors to:
        receive, from a client device, an input indicating selection of a geographic site;

select, based on receiving the input:
   one or more political boundaries associated with the geographic site,
   one or more cadastral boundaries associated with the geographic site, and
   one or more aerial images associated with the geographic site;
generate an overlay that comprises:
   a visual indication of the one or more political boundaries,
   a visual indication of the one or more cadastral boundaries, and
   a visual indication of one or more objects identified in the one or more aerial images,
      wherein the one or more objects are identified using a machine learning model, trained based on political boundaries, cadastral boundaries, and/or aerial images with seed sets of object boundaries that have been identified, to estimate object boundaries based on the identified political boundaries, identified cadastral boundaries, and/or identified aerial images;
transmit, to the client device, an instruction to display the overlay;
receive, based on transmitting the instruction to display the overlay, another input indicating selection of a geographic site boundary for the geographic site;
modify, based on receiving the other input, a shape of the geographic site boundary in the overlay from a predefined shape to a user-defined shape.

16. The non-transitory computer-readable medium of claim 15, wherein the one or more instructions, when executed by the one or more processors, further cause the one or more processors to:
   determine, based on the input, whether the one or more political boundaries are entirely viewable on a display of the client device; and
   wherein the one or more instructions, that cause the one or more processors to select the one or more political boundaries, cause the one or more processors to:
      select the one or more political boundaries based on:
         determining that the one or more political boundaries are entirely viewable on the display of the client device, and
         determining that the geographic site is located within the one or more political boundaries.

17. The non-transitory computer-readable medium of claim 15, wherein the input comprises:
an address associated with the geographic site; and
wherein the one or more instructions, that cause the one or more processors to select the one or more cadastral boundaries, cause the one or more processors to:
   determine that the address is associated with the one or more cadastral boundaries; and
   select the one or more cadastral boundaries based on determining that the address is associated with the one or more cadastral boundaries.

18. The non-transitory computer-readable medium of claim 15, wherein the one or more instructions, when executed by the one or more processors, further cause the one or more processors to:
   determine, based on the input, whether the one or more cadastral boundaries are entirely viewable on a display of the client device; and
   wherein the one or more instructions, that cause the one or more processors to select the one or more cadastral boundaries, cause the one or more processors to:
      select the one or more cadastral boundaries based on:
         determining that the one or more cadastral boundaries are entirely viewable on the display of the client device, and
         determining that the geographic site is located within the one or more cadastral boundaries.

19. The non-transitory computer-readable medium of claim 15, wherein the one or more instructions, when executed by the one or more processors, further cause the one or more processors to:
   identify the one or more objects in the one or more aerial images based on at least one of:
      shapes of the one or more objects in the one or more aerial images,
      contrast, in the one or more aerial images, associated with the one or more objects, or
      differences in color in the one or more aerial images.

20. The non-transitory computer-readable medium of claim 15,
wherein the geographic site boundary comprises:
   a political boundary of the one or more political boundaries,
   a cadastral boundary of one or more cadastral boundaries,
   an object boundary associated with an object of the one or more objects identified in the one or more aerial images,
   a user-modified political boundary of the one or more political boundaries,
   a user-modified cadastral boundary of one or more cadastral boundaries, or
   a user-modified object boundary associated with an object of the one or more objects identified in the one or more aerial images; and
wherein the one or more instructions, when executed by the one or more processors, further cause the one or more processors to:
   store, in a geocoding data structure, an association between the geographic site and the geographic site boundary.

\* \* \* \* \*